Feb. 20, 1951 L. D. BRIDGE 2,542,114
PRISMATIC DISPERSION LENS
Filed March 26, 1947

Inventor
Lawrence D. Bridge
By L. B. James
Attorney

Patented Feb. 20, 1951

2,542,114

UNITED STATES PATENT OFFICE 2,542,114

PRISMATIC DISPERSION LENS

Lawrence D. Bridge, Blairsville, Pa., assignor to
L. D. Bridge Company, Blairsville, Pa.

Application March 26, 1947, Serial No. 737,199

1 Claim. (Cl. 240—106.1)

This invention relates to lenses for automobile lights.

The primary object of this invention resides in the provision of a lense for automobile lamps adapted to distribute the light rays cast from the electric bulbs of the lamps thereof.

Another object of this invention resides in so constructing the lens as to produce an extremely wide dispersion of the light from a lamp placed behind the lens.

A still further object of this invention resides in the provision of a novel form of lens whereby the light field produced thereby will be stationary and uniform throughout.

One of the salient features of this invention resides in the particular construction and arrangement of the segmento-cylindrical sections of the lens.

Among the many objects of this invention is the provision of a lens having its segmento-cylindrical sections disposed inwardly of a smooth front surface.

With these and other objects in view, this invention resides in certain novel features of construction and arrangement of elements to be hereinafter more particularly set forth in the specification, illustrated in the accompanying drawing and pointed out in the appended claim and, although this disclosure depicts my present conception of the invention, the right is reserved to resort to such changes in construction and arrangement of elements as come within the spirit of the invention.

In the accompanying drawing forming a part of this application;

Figure 1:
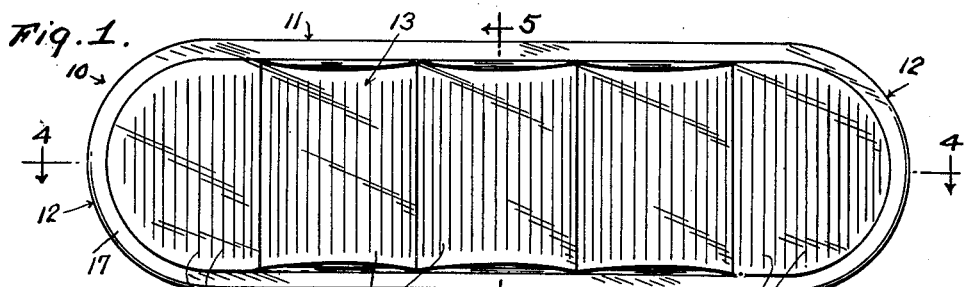
Fig. 1 is a front view of the lens.
Figure 2:
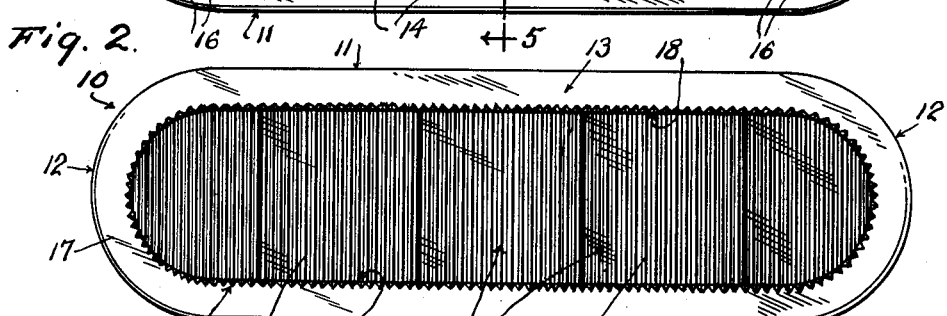
Fig. 2 is a rear view of the lens.
Figure 3:
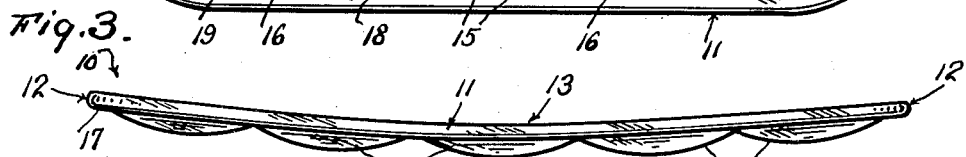
Fig. 3 is a plan view thereof.
Figure 4:
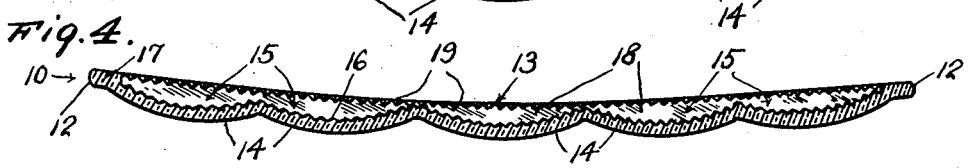
Fig. 4 is a sectional view taken approximately on line 4—4 of Fig. 1.
Figure 6:
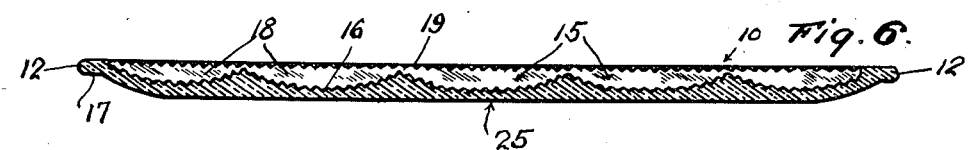
Fig. 6 is a longitudinal sectional view similar to Fig. 3 showing a straight lens with a smooth outer surface.

In the present illustration of this invention, the lens 10 is formed from an elongated curved piece of transparent and light refracting material such as glass and preferably has circular top and bottom edges 11 and substantially semi-circular ends 12 though it may be of any desired outline just so the body portion 13 thereof lies on an arcuate or curved line throughout its length.

The front surface of the body portion 13 of the lens is formed by a series of segmento-cylindrical sections 14 having smooth outer surfaces. Said sections 14 are all preferably of the same width and have the same radii of curvature so all of them will project an equal distance forwardly and at approximately equal distance from an electric bulb in a lamp. The axes of said cylindrical segments are vertical and disposed on an arcuate line when the lens is in normal position of use. The rear or inner faces of the segmento-cylindrical sections are provided with a plurality of concavities 15 which are generally concentric to the surfaces 14 but which are formed with a multiplicity of small prismatic projecting portions 16 preferably equal in cross section and extending parallel to the axes of the portions 14.

Around the body portion a rim 17 extends to facilitate securing the lens to a lamp by a suitable ring and screws (not shown). The prisms 16 extend between the circular portions while the convex portions 14 extend well forwardly of the rim 17, but close at their upper and lower ends by flat portions 18.

The inner edges of the concavities 15 are provided with prismatic projections 19 in alignment with the aforesaid prismatic projections 16 to form continuations therefrom and thereby prevent uninterrupted rays of light from passing through the lens along the inner edge of the retaining ring heretofore mentioned but not shown.

In operation a single electric bulb or other source of light is disposed behind the center of the lens with its optical axis the axis of the center projection 13. With the lamp so disposed, the light rays from the lamp strike the prisms approximately at their apexes and are refracted thereby to evenly spread through the thickness of the lens after which the curvature surfaces 14 serve to further direct the rays laterally, the rays from the several surfaces 13 intersecting each other. By the aforesaid means an extremely wide dispersion of the light from the lamp is obtained so the effective light produced is in the form of a wide beam having comparatively little vertical extension.

Figure 5:
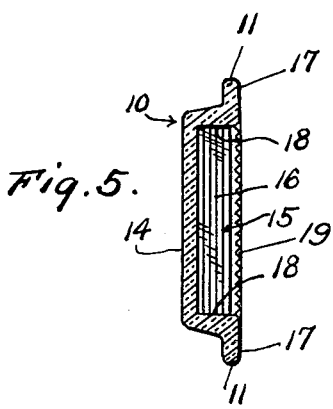
Fig. 5 is a sectional view taken approximately on line 5—5 of Fig. 1.

In that form of the lens shown in Fig. 5 of the drawing the sections 14 are connected or provided with a continuous smooth outer surface 25, the lens being flat but may be constructed on an arcuate line as shown in Figs. 1 to 4 inclusive.

With this invention fully described, it is manifest that a lens is provided which will spread the rays of light passing therethrough over a wide horizontal area with an appreciable vertical projection thereof from the upper and lower sides of the lens and, through the simplicity of construction of the lens, it can be manufactured and sold at a reasonable price.

Having thus described my invention, what I claim and desire to protect by Letters Patent is:

An illuminating and light distributing lens including an elongated curved body portion of transparent and light refracting material having a vertical axis, said structure having an outer surface provided with a plurality of transversely extending convex segmento-cylindrical abutting portions arranged side by side with their axes disposed in spaced relation on an arcuate line in parallelism to that line upon which the body portion lies, said body portion having an inner face provided with a multiplicity of prismatic projections arranged side by side and parallel to the axes of the segmento-cylindrical portions, said segmento-cylindrical portions having equal radii and arcs of curvature and the prismatic projections all having equal cross sections, said body portion having a peripheral rim including side portions between which the prismatic projections extend and having the concavities of the segmento-cylindrical portions projecting forwardly of a surface defined by the face of the rim, and prismatic projections formed on the inner edges of the upper and lower walls of the concavities and substantially in alignment with the first mentioned prismatic projections.

LAWRENCE D. BRIDGE.

REFERENCES CITED

The following references are of record in the file of this patent:

UNITED STATES PATENTS

| Number | Name | Date |
|---|---|---|
| 2,264,109 | Bridge | Nov. 25, 1941 |
| 2,264,110 | Bridge | Nov. 25, 1941 |
| 2,366,356 | Rolph | Jan. 2, 1945 |